United States Patent [19]

Levy

[11] Patent Number: 5,133,666
[45] Date of Patent: Jul. 28, 1992

[54] EDUCATIONAL CLOCK APPARATUS

[76] Inventor: Randolph N. Levy, P.O. Box 27832, Los Angeles, Calif. 90038

[21] Appl. No.: 754,639

[22] Filed: Sep. 4, 1991

[51] Int. Cl.⁵ ................................................ G09B 19/12
[52] U.S. Cl. .................................................... 434/304
[58] Field of Search ................. 434/304, 433; 446/267

[56] References Cited

U.S. PATENT DOCUMENTS

| | | | |
|---|---|---|---|
| 2,172,450 | 9/1939 | Pitcher | 434/304 |
| 3,702,507 | 11/1972 | Romey | 434/304 |
| 3,967,389 | 7/1976 | Brooks | 434/304 |
| 4,368,045 | 1/1983 | Kuh | 434/304 |

Primary Examiner—John J. Wilson
Assistant Examiner—Jeffrey A. Smith
Attorney, Agent, or Firm—Leon Gilden

[57] ABSTRACT

An educational clock face includes a medial divider line directed diametrically through the clock face from the twelve through the six to demarcate time subsequent to and preceding each hour in a learning procedure, as well as each of the clock digits defined between one and eleven inclusively provided with indications of the total of minutes subsequent to and prior to each hour. The hour and minute indicator hands are provided with enumeration to indicate their status, wherein the structure of the clock face arranged for mounting relative to existing clock faces. In a modification of the invention, the clock face is further formed with quadrants including variously colored fluids, with illumination members directed below the fluids and the hour and minute hands each include contrastingly colored fluids, wherein the hour and minute hands define various colorations as they are directed about the various quadrants in combination with a contrasting coloration of an associated quadrant underlying each hour and minute hand respectively.

2 Claims, 5 Drawing Sheets

EDUCATIONAL CLOCK APPARATUS

BACKGROUND OF THE INVENTION

1. Field of the Invention

The field of invention relates to learning apparatus, and more particularly pertains to a new and improved educational clock apparatus wherein the same is arranged to assist in the education and understanding of utilization of a clock.

2. Description of the Prior Art

Clock learning structure has been set forth in the prior art to assist in educating children and the like in the use of clocks and their association as time pieces. For example, U.S. Pat. No. 3,702,507 to Romey sets forth a clock structure of that category, with hour and minute hands of varying colorations and providing indicia on the clock face to assist in a teaching procedure.

U.S. Pat. No. 3,967,389 to Brooks sets forth a time teaching aid wherein various colorations and indicia are also mounted on the clock face to assist in a teaching procedure.

U.S. Pat. No. 3,131,489 to Alpert; U.S. Pat. No. 2,994,970 to Spooner; and U.S. Pat. No. 4,124,945 to Totten are further examples of time pieces to assist in the understanding of time relative to positioning of the hour and minute hands of a clock face.

As such, it may be appreciated that there continues to be a need for a new and improved educational clock apparatus as set forth by the instant invention which addresses both the problems of ease of use as well as effectiveness in construction in permitting ease of understanding of time keeping and in this respect, the present invention substantially fulfills this need.

SUMMARY OF THE INVENTION

In view of the foregoing disadvantages inherent in the known types of educational clock apparatus now present in the prior art, the present invention process an educational clock apparatus wherein the same is directed to provide for a clock face with instructional indicia directed throughout the clock face to assist in a teaching procedure. As such, the general purpose of the present invention, which will be described subsequently in greater detail, is to provide a new and improved educational clock apparatus which has all the advantages of the prior art education clock apparatus and none of the disadvantages.

To attain this, the present invention provides an educational clock face including a medial divider line directed diametrically through the clock face from the twelve through the six to demarcate time subsequent to and preceding each hour in a learning procedure, as well as each of the clock digits defined between one and eleven inclusively provided with indications of the total of minutes subsequent to and prior to each hour. The hour and minute indicator hands are provided with enumeration to indicate their status, wherein the structure of the clock face arranged for mounting relative to existing clock faces. In a modification of the invention, the clock face is further formed with quadrants including variously colored fluids, with illumination members directed below the fluids and the hour and minute hands each include contrastingly colored fluids, wherein the hour and minute hands define various colorations as they are directed about the various quadrants in combination with a contrasting coloration of an associated quadrant underlying each hour and minute hand respectively.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved educational clock apparatus which has all the advantages of the prior art educational clock apparatus and none of the disadvantages.

It is another object of the present invention to provide a new and improved educational clock apparatus which may be easily and efficiently manufactured and marketed.

It is a further object of the present invention to provide a new and improved educational clock apparatus which is of a durable and reliable construction.

An even further object of the present invention to provide a new and improved educational clock apparatus which is susceptible of a low cost of manufacture with regard to both materials and labor, and which accordingly is then susceptible of low process of sale to the consuming public, thereby making such educational clock apparatus economically available to the buying public.

Still yet another object of the present invention to provide a new and improved educational clock apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
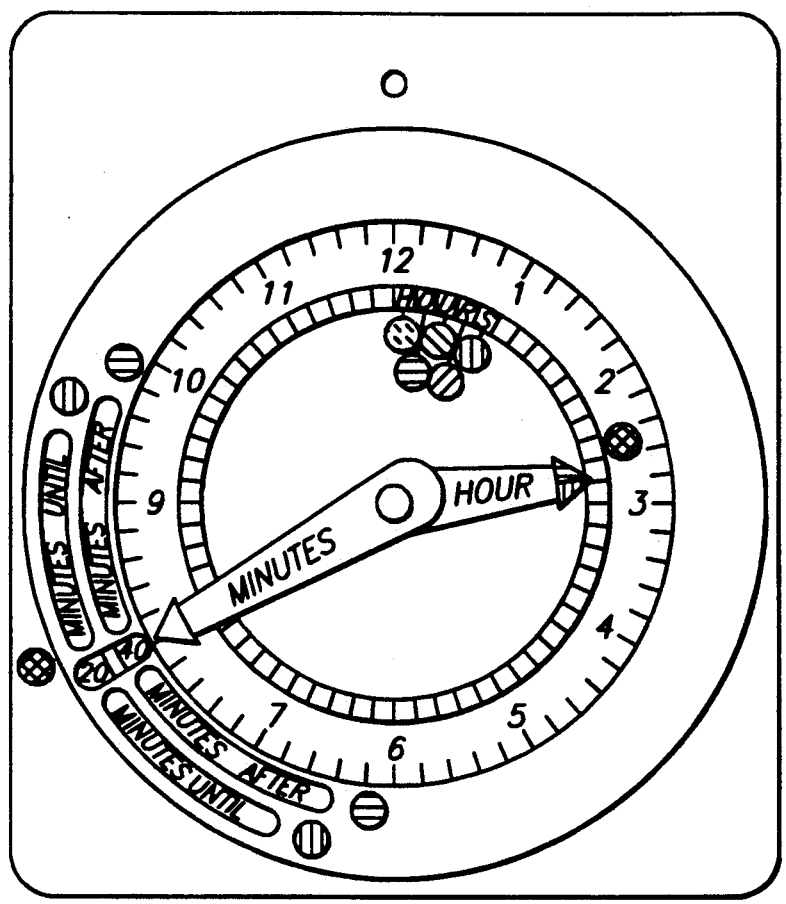
FIG. 1 is an orthographic top view of a prior art clock apparatus.

With reference now to the drawings, and in particular to FIGS. 1 to 6 thereof, a new and improved educational clock apparatus embodying the principles and concepts of the present invention and generally designated by the reference numeral 10 will be described.

Figure 2:
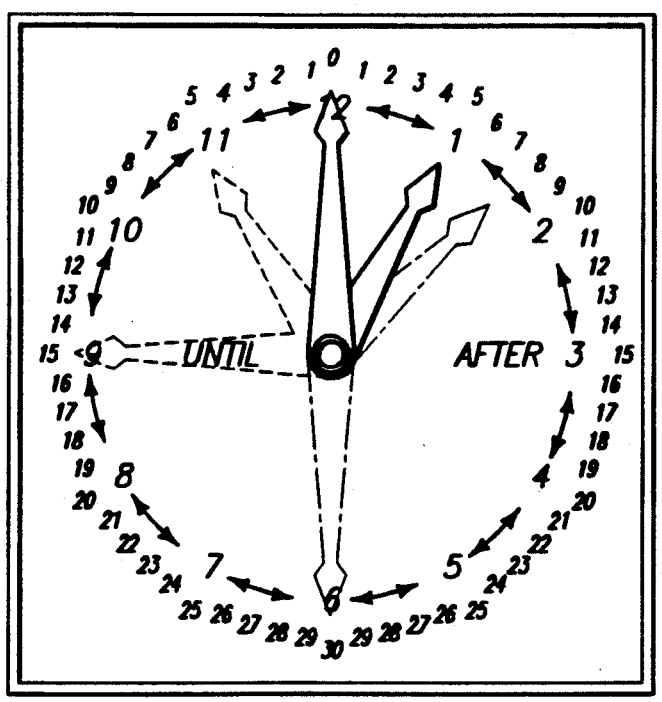
FIG. 2 is an orthographic view of a further prior art clock apparatus.
Figure 3:
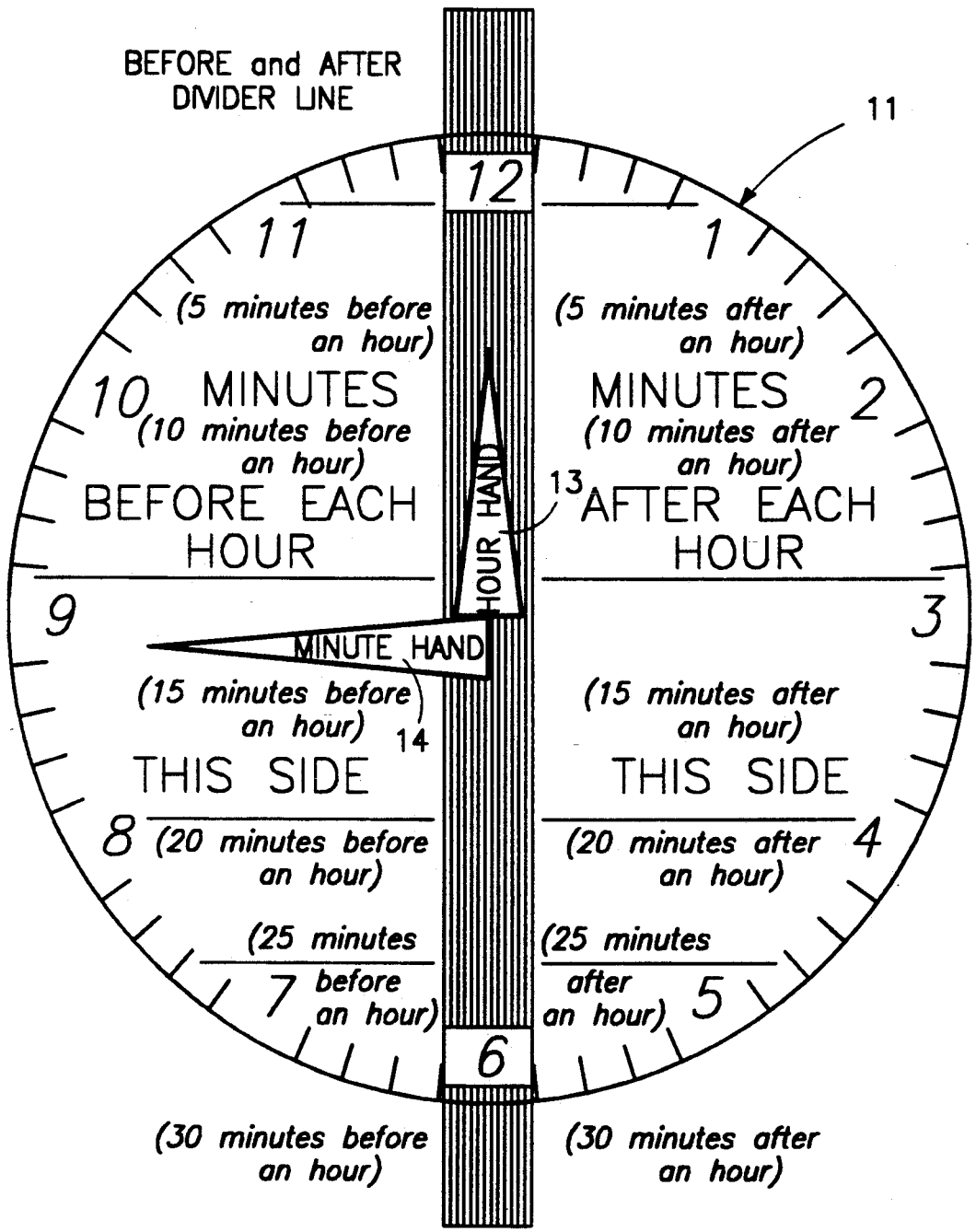
FIG. 3 is an orthographic top view of the instant invention clock face.

FIG. 1 is an educational clock structure as set forth in U.S. Pat. No. 3,967,389 to Brooks wherein a manual manipulatable clock sets forth various indicia and learning tools utilizing various colorations in association with recognizable script. A further example is set forth U.S. Pat. No. 3,702,507 as illustrated in FIG. 2, wherein the clock face utilizes unlike colorations to the hour hand and minute hand, as well as utilizing numerals in ascending order from the twelve to the six hour marker in ascending from one to thirty minutes, wherein descending order of thirty to zero minutes is directed from the six to the twelve in assisting in education and understanding of time before and time after particular hours on the clock face.

More specifically, the educational clock apparatus 10 of the instant invention essentially comprises a clock face 11, with clock digits directed about the periphery thereof extending from one through twelve arranged in conventional orientations about the clock face. A divider bar bisects diametrically the clock face 11 directed through the twelve and the six to divide the clock face into a right and left semi-circular portion. An hour hand 13 is defined by a first length and a minute hand 14 defined by a second length and are so indicated and designated as an hour and minute hand. The clock face 11 is arranged adjacent each digit and in the right semi-circular portion, the minutes after the hour are indicated adjacent each of the integers, wherein the integer six indicates both thirty after and thirty minutes before an hour and are so indicated on each side of the respective right and left sides of the divider bar adjacent the integer six. The integers seven through eleven indicate the minutes before an hour and are so indicated adjacent each of the integers seven through eleven. The right semi-circular portion includes in bold face indication that the "minutes after each hour this side" is imposed thereon, wherein the left semi-circular portion includes the "minutes before each hour this side" imposed thereon. In this manner, during a teaching procedure, the minutes before and the minutes after each hour are easily ascertainable in a teaching and learning procedure, with the hands 13 and 14 manipulatable to assist in positioning the hands relative to a teaching procedure. The clock face 11 is contemplated for use as a transparent overlay as desired for mounting upon conventional clock faces, if desired.

Figure 4:
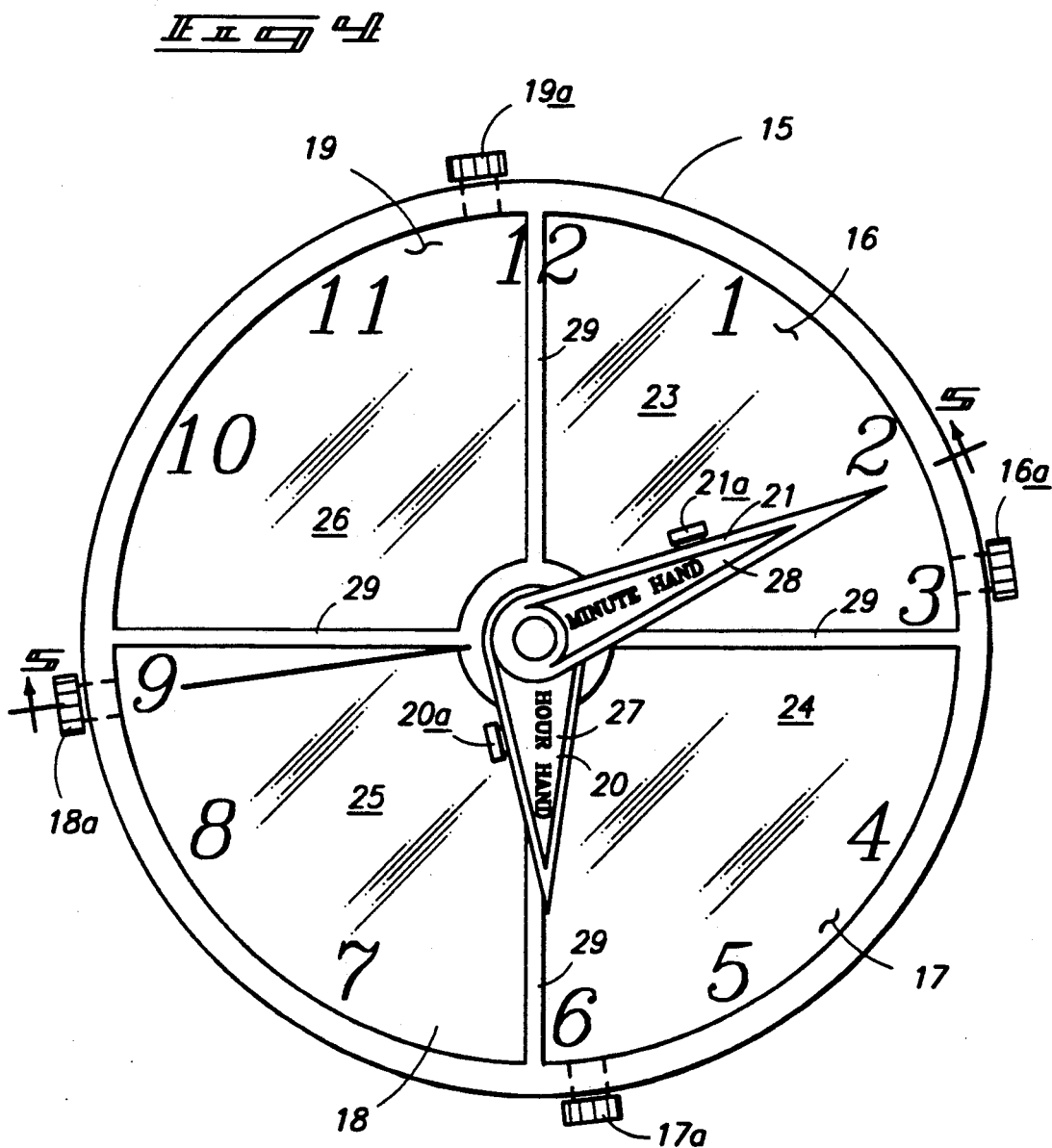
FIG. 4 is an orthographic top view of a clock housing utilized in association with a clock face.
Figure 5:
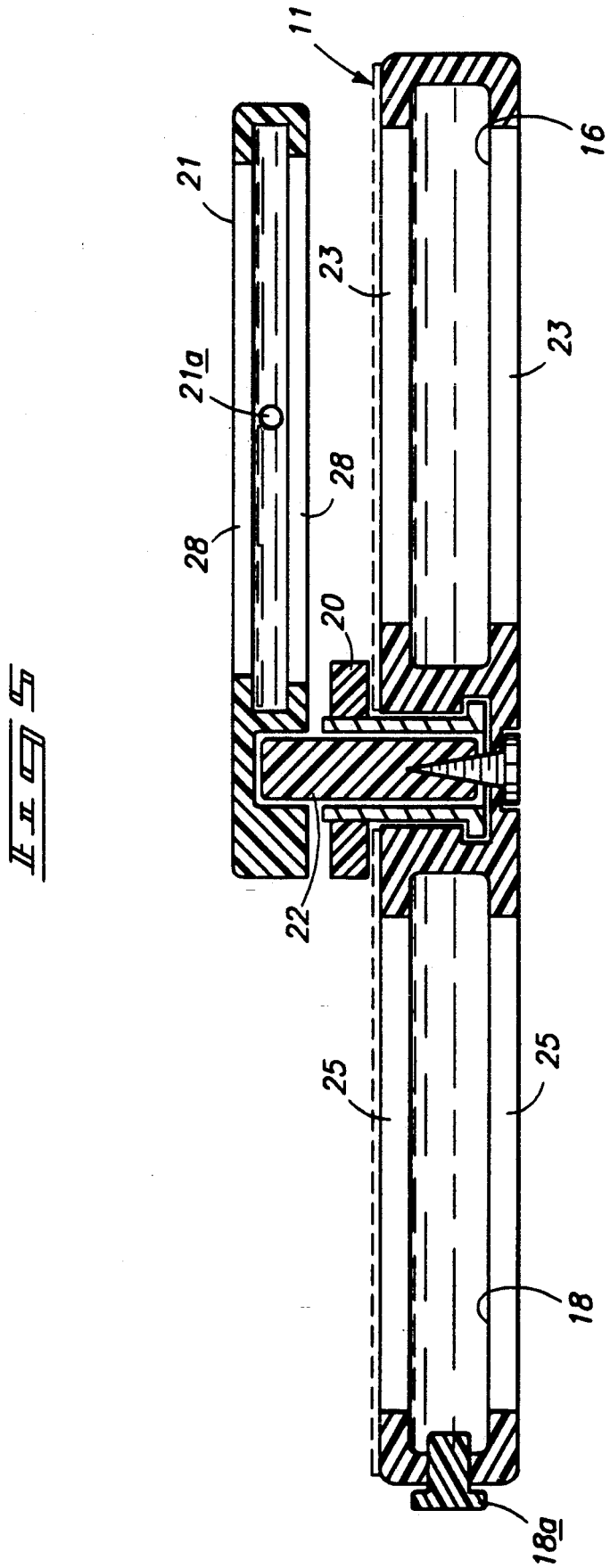
FIG. 5 is an orthographic view, taken along the lines 5—5 of FIG. 4 in the direction indicated by the arrows.
Figure 6:
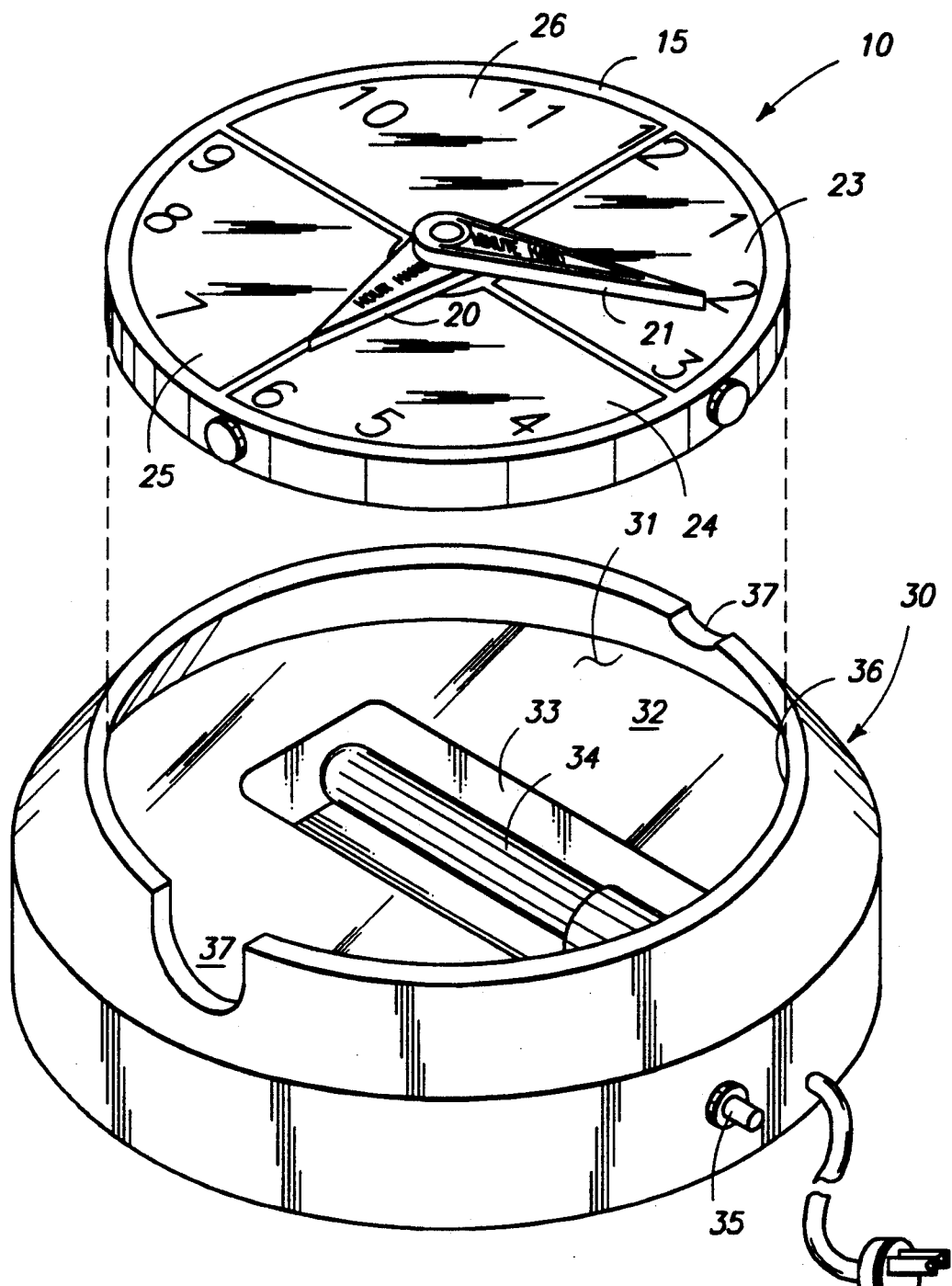
FIG. 6 is an isometric illustration of the invention.

Further, the FIGS. 4-6 illustrate apparatus to enhance ease of learning, wherein the apparatus includes a cylindrical housing 15 that includes within the housing 15 a respective first, second, third and fourth pie-shaped fluid chamber quadrant 16, 17, 18, and 19 respectively. Each quadrant includes a respective first fill plug 16a, second fill plug 17a, third fill plug 18a, and fourth fill plug 19a to permit changing of the fluid therewithin. The cylindrical housing 15 includes radially directed opaque partition walls 29 that are radially directed relative to a central axial portion of the housing 15 to define the chamber quadrants 16-19 respectively. The first through fourth chamber quadrants are filled with respective first, second, third, and fourth fluids of a translucent contrasting coloration. The minute hand and the hour hand 21 and 20 respectively are rotatably mounted to support axle 22 and each include respective fill plugs 21a and 20a respectively for filling each of the hollow minute and hour hands with a further contrasting fluid. The first through fourth chamber quadrants include respective first through fourth chamber quadrant transparent floor and roof panels 23, 24, 25, and 26 (see FIG. 5) that are coextensive and parallel relative to one another to define the respective enclosed chamber therebetween. The hour and minute hands 20 and 21 each include a respective fifth and sixth coloration with the respective hour and minute hands, and include respective transparent floor and roof panels 27 and 28 that are transparent and in a coextensive parallel relationship to define the hour and minute hand chambers therewithin. The cylindrical housing 15 is then complimentarily received within a support housing 30, as illustrated in FIG. 6. The support housing 30 defines a cylindrical cavity 31 that includes a cavity wall 36 defined by a predetermined height substantially equal to a predetermined height defined by the housing 15. Cavity wall recesses 37 that are diametrically opposed through the cavity wall 36 permit ease of insertion and removal of the cylindrical housing 15 within the support housing 30. The cavity 31 includes a cavity floor 32, the cavity floor 32 including an illumination bulb cavity 33 mounting an illumination bulb 34 therewithin, whereby through an illumination bulb switch 35 selective illumination of the bulb 34 is effected. When illumination is directed through the cylindrical housing 15, the contrasting fluids of the respective minute and hour hands 21 and 20 will change in coloration as they are positioned above varying first through fourth chamber quadrants 16 through 19. For example, a first fluid within the first chamber 23 such as red with a sixth coloration fluid within the minute hand such as yellow will define an orange coloration when the illumination bulb 34 directs illumination through the first chamber quadrant 16 and the minute hand 21. In this manner, the positioning of the hour and minute hands over the various quadrants provides a teaching tool to enhance attention and intersect, as well as directing attention to the various quadrants about the clock face, particularly when the clock face 11 is positioned over the cylindrical housing 15, as illustrated in phantom in FIG 5.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United Sates is as follows:

1. An educational clock apparatus, comprising,
   a clock assembly, including a circular clock face, the circular clock face including clock integers imparted on the clock face and arranged about the clock face, and
   an opaque divider bar bisecting the clock face into a right semi-circular portion and a left semi-circular portion, and
   the right semi-circular portion including indicia to indicate minutes after a designated hour, and
   indicia on the left semi-circular portion to communicate minutes before said designated hour, and
   the clock face formed of a transparent flexible web, and
   the clock assembly includes a cylindrical clock housing, the clock housing including four radially directed opaque partition walls positioned within the housing spaced apart ninety degrees relative to one another defining a respective first, second, third, and fourth fluid filled chamber quadrant within the clock housing, the first, second, third, and fourth respective chamber quadrants including a respective first, second, third, and fourth fluid, with each fluid of a contrasting coloration, and
   each chamber quadrant includes a transparent floor and transparent roof, wherein the transparent floor and the transparent roof of each chamber quadrant are in a parallel spaced coextensive relationship relative to one another, and the minute hand includes a transparent minute hand roof and a minute hand floor, wherein the minute hand roof and the minute hand floor are in coextensive parallel relationship with a sixth fluid contained within the minute hand, wherein the hour hand includes an hour hand roof and an hour hand floor arranged in a parallel spaced coextensive relationship to include a fifth fluid of a contrasting coloration contained within the hour hand, wherein the hour hand and the minute hand are rotatably mounted about a support axle, the support axle coaxially directed at a junction of the partition walls.

2. An apparatus as set forth in claim 1 including a support housing, the support housing including a cylindrical cavity, the cylindrical cavity including a cavity wall in surrounding relationship thereto, and the cylindrical cavity including a cavity floor, the cylindrical cavity defined by a predetermined height from the cavity floor to an upper terminal end of the cavity wall, and wherein the cylindrical housing is defined by a predetermined thickness equal to the predetermined height to complimentarily position the cylindrical housing within the cylindrical cavity, and the cavity floor including an illumination bulb cavity, the illumination bulb cavity including an illumination bulb mounted therewithin, and the illumination bulb cavity positioned medially of the cavity floor, and an illumination bulb switch arranged for selective illumination of the illumination bulb to direct illumination through the cylindrical housing and the minute hand and the hour hand to effect varying colorations of the minute and the hour hand positioned above selective chamber quadrants of said first, second, third and fourth chamber quadrants.

* * * * *